Aug. 31, 1948.  W. S. RENIER  2,448,277
APPARATUS FOR FORMING AND PREHEATING
SLUG OF MOLDABLE MATERIAL
Filed Feb. 1, 1945  3 Sheets-Sheet 1

INVENTOR.
William S. Renier
BY
Morsell & Morsell
ATTORNEYS.

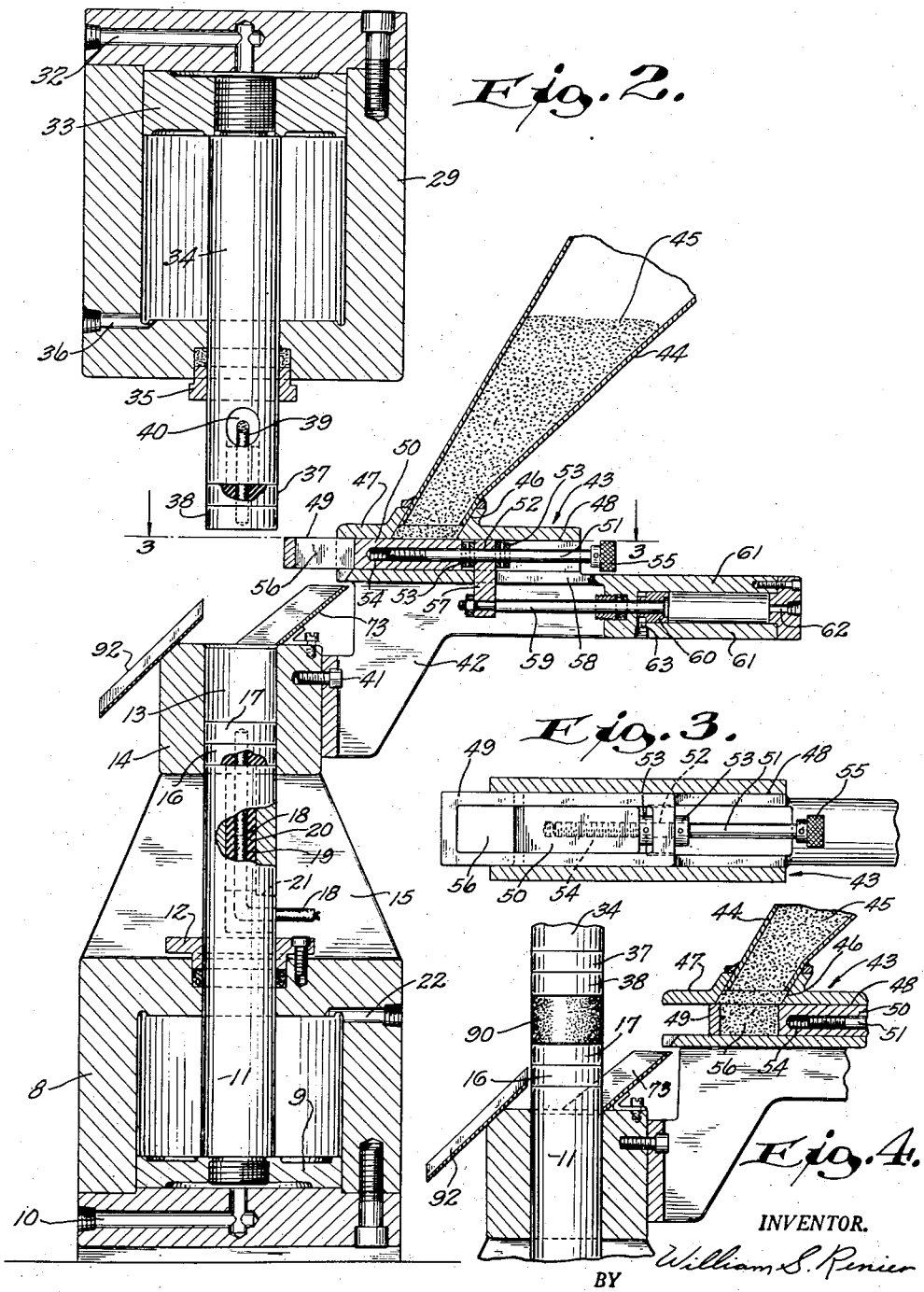

Aug. 31, 1948.                    W. S. RENIER                    2,448,277
                   APPARATUS FOR FORMING AND PREHEATING
                            SLUG OF MOLDABLE MATERIAL
Filed Feb. 1, 1945                                          3 Sheets-Sheet 3

*Fig. 5.*

INVENTOR.
William S. Renier
BY
Morsell & Morsell
ATTORNEYS.

Patented Aug. 31, 1948

2,448,277

UNITED STATES PATENT OFFICE 2,448,277

APPARATUS FOR FORMING AND PREHEATING SLUGS OF MOLDABLE MATERIAL

William S. Renier, Milwaukee, Wis.

Application February 1, 1945, Serial No. 575,641

10 Claims. (Cl. 18—16)

1

This invention relates to improvements in apparatus for forming and pre-heating slugs of moldable material.

In the handling of thermosetting plastic materials, to prepare the same for use in a molding apparatus, it is now common practice to preform a slug of plastic material in one machine and then pre-heat the slug in another machine to start the curing process.

It is a general object of the present invention to provide apparatus whereby the forming and pre-heating may be affected expeditiously in a single machine.

A more specific object of the invention is to provide apparatus of the class described wherein the slug is compressed in a cylinder between the ends of two movable plungers and then while still held between said plunger ends, is moved to an exposed position in the atmosphere and heated while in said exposed position.

A further object of the invention is to provide apparatus as above described wherein the plunger ends serve as electrodes in an electrical heating circuit whereby high frequency current passing from one electrode to the other will pass through the slug to pre-heat the latter.

A further object of the invention is to provide improved means for measuring and delivering a predetermined amount of moldable material to the apparatus.

Other objects of the invention are to provide apparatus of the class described which is relatively simple and inexpensive; which is well adapted for high speed automatic operation; and which is otherwise well adapted for the purpose described.

With the above and other objects in view, the invention consists of the improved apparatus for forming and pre-heating slugs of moldable material and all its parts and combinations as set forth in the claims, and all equivalents thereof.

In the accompanying drawings illustrating one complete embodiment of the preferred form of the invention in which the same reference numerals designate the same parts in all of the views:

Fig. 2 is a sectional view taken on the line 2—2 of Fig. 1;

Fig. 3 is a sectional view taken on the line 3—3 of Fig. 2;

Fig. 4 is a fragmentary sectional view, similar

Figure 1:
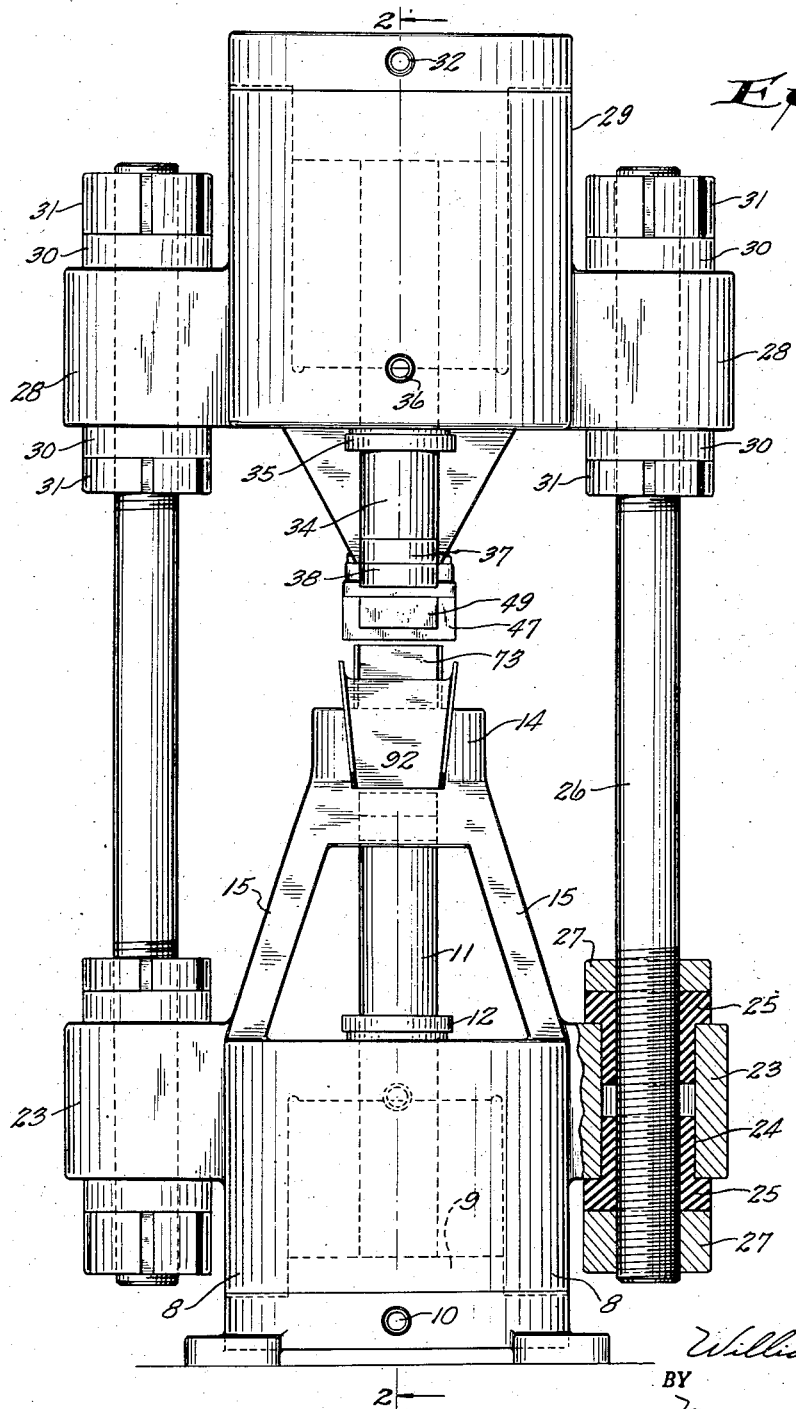
Fig. 1 is a front elevational view of the improved apparatus, part being broken away and shown in section.

2 to Fig. 2, illustrating the formed slug in heating position; and

Fig. 5 is a diagrammatic view illustrating a manually controlled hydraulic circuit.

Referring more particularly to the drawing, the numeral 8 designates a bottom hydraulic cylinder having a piston 9 movable therein. Hydraulic fluid under pressure from a suitable source admitted through the inlet duct 10 (Fig. 2) is adapted to cause movement of the piston 9 from the position of Fig. 2 to a raised position in which a plunger 11, connected at its lower end to the piston, is moved from the position of Fig. 2 to the position of Fig. 4.

The plunger 11 is of substantial length and projects upwardly through a suitable packing gland 12. The extreme upper end of the plunger extends into the lower end of the forming chamber 13 in a receptacle member 14. The member 14 is supported in a position spaced above the top of the cylinder 8 by means of extension plates 15.

Secured to the upper end of the plunger 11 is a disc 16 of electrical insulating material and above the disc is a heating electrode 17. A conductor 18 for electricity has its upper end in electrical connection with the electrode 17 and extends downwardly through the center of the insulating disc 16 and through a bore 19 formed in a core 20. The core 20 is also formed of electrical insulating material. The lower end of the bore 19 communicates with a transverse opening 21 located intermediate the length of the plunger 11. The outer end of the opening 21 communicates with a side of the plunger so that the conductor 18 may extend outwardly to be connected with a source of high frequency current. The opening 21 is so located that when the plunger 11 is in its lowermost position, the opening is above the top of the cylinder 8. When the plunger is in its maximum extended position, the opening is below the lower end of the receptacle member 14. Thus, the conductor 18 will not interfere with movement of the plunger and can extend laterally outwardly between the spaced extension plates 15. The conductor and electrode 17 are completely insulated from the machine when electricity is flowing.

Movement of the piston 9 in a downward direction is effected by introducing a hydraulic fluid under pressure into the cylinder duct 22. This will, of course, cause the exhausting of hydraulic fluid from below the piston 9 through the duct 10 and return of said fluid to the oil reservoir in connection with an hydraulic pump.

Projecting laterally from the sides of the cylinder 8 are ears 23 having vertical bores 24. Collars 25 of electrical insulating material are fitted in each of the bores 24 and the threaded lower end portion of a supporting rod 26 extends through each set of collars 25. Nuts 27 lock the extension rods in a desired position of vertical adjustment.

The upper ends of the supporting rods 26 extend through ears 28 which project from the sides of a top cylinder 29. These rods extend through electrical insulating material 30, and the upper ends are maintained in a desired position of adjustment by nuts 31 threaded on the rods. The construction inside of the ears 28 is the same as heretofore described in connection with the lower ears 23.

Hydraulic fluid admitted under pressure through a duct 32 in the upper cylinder 29 is adapted to cause downward movement of a piston 33 and upper plunger 34. Fluid from below the piston is exhausted through a port 36. The lower end of the plunger 34 extends through a suitable packing gland 35 and projects below the lower end of the cylinder 29.

Secured to the lower end of the plunger 34 is a disc 37 of electrical insulating material and below the disc is an electrode 38. An electrical conductor 39 has its lower end electrically connected to the electrode 38 and extends through an insulating core to a transverse opening 40. The conductor may extend laterally from the opening 40 to be connected with the same source of high frequency current to which the lower conductor 18 is connected. The conductor 39 and electrode 38 are completely insulated from the machine when electricity is flowing.

Connected to the side of the receptacle member 14 by one or more bolts 41 is a bracket 42 which supports a metering and feed unit 43. This unit includes a hopper 44 for holding a quantity of moldable material 45. This material is usually in powdered form and the invention is particularly concerned with the handling of thermosetting plastic material. It is, however, adapted for use in connection with other materials where preformed and pre-heated slugs are desired.

The lower end of the hopper 45 communicates with an opening 46 in a housing member 47. The member 47 has a horizontal guideway 48 extending therethrough within which a feed slide 49 is movable as shown in Figs. 2 and 3. The slide 49 is in the form of a rectangular frame and within the frame is an adjustment block 50. A rod 51 extends rotatably through a bore 52 in the rear end of the slide 49. The rod is maintained against longitudinal movement with respect to the slide 49 by means of collars 53 which are pinned to the rod. The inner end of the rod is threaded and cooperates with a threaded bore 54 in the block 50. It is apparent that when the knurled handle 55 at the outer end of the rod 51 is manually rotated that the block 50 will be moved in one direction or the other to vary the effective size of the metering space 56.

The rear end of the slide 49 has an integral portion which projects downwardly, as at 57, through a slot 58 in the bracket 42. A rod 59 has its outer end connected to the extension 57, and the inner end of the rod is connected to a piston 60 movable in an hydraulic cylinder 61. Hydraulic fluid under pressure admitted through the duct 62 will cause movement of the piston 60, rod 59 and slide 49 to the position of Fig. 2. By reversing the flow of hydraulic fluid, that is, by causing fluid under pressure to enter the other duct 63 in the cylinder 61 and to be exhausted through the duct 62, the slide 49 may be returned to a position wherein the receiving opening 56 is located below the hopper to receive a new charge of material therefrom.

In use of the device, with the plungers 11 and 34 in the positions of Fig. 4 and with the feed piston 60 in retracted position so that the measuring space 56 is beneath the hopper 44, a charge of moldable material will flow by gravity from the hopper into the space 56 of the slide 49. The block 50 has previously been adjusted so that the space 56 will hold the exact quantity of material necessary to form a slug of predetermined size and shape.

Referring now to Fig. 5 this illustrates a manually controlled hydraulic circuit. Valve 64 is a 4-way valve which can be actuated by a hand lever 65 to shift the valve to the various positions required for operation. When the valve 64 is in the proper position hydraulic fluid will flow from the pump 66 through the line 67 into the valve at port 68. The valve is so adjusted that the fluid from port 68 will flow to port 69 and into hydraulic line 70. Hydraulic line 70 connects with lines 71 and 72. Line 72 connects with the top duct 22 of the lower cylinder 8. Line 71 connects with the port 62 of the feed cylinder 61. As the result, fluid under pressure will cause the feed cylinder slide to move to the left, referring to Fig. 4, and the lower plunger 11 of the hydraulic cylinder 8 will also start its downward movement. This will eventually result in the delivery of a measured batch of the moldable material 45 into the chute 73 and into the forming chamber 13. The parts are now in the position of Fig. 2 with a slug of moldable material resting on top of the electrode 17. As the piston 9 of the lower cylinder moves downwardly, hydraulic fluid flows from beneath the piston out of port 10, and into the line 74. The line 74 connects with the port 75 of the valve 64 and the position of the valve is such that the exhausted fluid can pass through the valve and out of the conduit 76 leading to the pump reservoir 77.

The valve 64 is now turned to the stop position wherein all ports are blocked. Next, the operating lever 78 of the 4-way valve 79 for the top cylinder 29 is manipulated to connect the valve port 80 with the valve port 81. This then permits the flow of hydraulic fluid from the pump 66 through the line 82 through the valve to the line 83 and into the line 84 leading to the top port 32 of the upper cylinder 29. This causes downward movement of the piston 33 and plunger 34 until the lower end of the latter plunger has entered the top of the forming chamber 13 to compress the moldable material resting on electrode 17 into a slug having the shape of the forming chamber. As the upper piston 33 is moving downwardly, fluid from below the piston flows out of port 36 into line 85, into the valve at 86 and out of the valve through the line 87 leading to the tank 77. Valve 79 is, of course, constructed in the usual manner to connect the port 86 with the exhaust line 87 at the same time that fluid is flowing from the pump through the other side of the valve.

Four-way valve 79 is of standard construction except that it also includes a by-pass which connects ports 86 and 81 when all of the other ports are blocked. This by-pass is necessary in the next operation of the machine.

After the slug of material has been compressed in the form of a cylinder the valve 79 is turned to a position to block all of the ports except the by-pass between ports 86 and 81. Next, the other valve 64 is manipulated to direct the hydraulic fluid under pressure from the pump 66 through line 67 into port 68, and from port 68 to port 75. From port 75 some of the hydraulic fluid flows through line 74 to the lower side of the piston 9. Other fluid flows through the line 87 leading to the port 63 of the feed cylinder 61. This causes the feed cylinder plunger to move back to the position of Fig. 4. The piston 9 and bottom plunger 11 are now travelling upwardly and pushing against the formed slug and in effect against the lower end of the upper plunger 34. During such movement, fluid from the above of the top piston 33 is exhausted into line 84. Some of this exhausted fluid from line 84 flows through line 83, through the by-pass between 81 and 86, and through line 85 to the lower side of the piston 33. However, due to the space occupied by the plunger 34, the chamber below the piston 33 cannot accommodate all of the exhausted fluid. Some of the fluid, therefore, will flow from line 84 through line 88 and past a relief valve 89. The relief valve is adjustable to suit the requirements. It will offer just sufficient resistance so that the plunger 34 will not move upwardly too freely. Thus the slug of material, indicated by the numeral 90 in Fig. 4, will be firmly held between the plunger ends. Fluid in line 88, after it passes the relief valve, will flow past a one-way check valve 91 and into the line 71. From the line 71 this fluid will merge with fluid which is being exhausted from above the lower piston 9 and will then pass through the line 70 into the valve 64. The valve 64 is in such a position that the port 69 is connected with the line 76 leading to the reservoir 77. After the slug has been raised to the position of Fig. 4 the operation of the lower plunger is stopped.

Next high frequency current from any suitable source of electricity is caused to flow through the conductors 39 and 18 to the electrodes 38 and 17. Inasmuch as the circuit for said electricity is broken only by the gap between the two electrodes, when the latter are in the position of Fig. 4, the electricity will pass from one electrode to the other through the slug of material 90. The current will be of such a type that it will cause heating of the slug. After heating and just as the lower plunger 11 starts downwardly again to start a new cycle of operation the slug may be removed manually or in any other suitable way. It may be guided into a delivery chute 92 and this chute may deliver the preheated slug directly into a molding machine for thermosetting plastic compounds such as the machine illustrated in my pending application, Serial 556,514, filed September 30, 1944, now abandoned. The slug will be of the exact size and shape necessary for the molding machine and will be preheated to start the curing process.

In lieu of the manually operated control circuit just described an automatic control may be substituted by replacing the manually operated 4-way valves 64 and 79 by solenoid operated valves of similar type. These valves would then be under the control of a suitable electric circuit.

For certain types of materials which are not in powdered form, the measuring device 43 may be eliminated and the material may be fed in any other desired manner to the chute 73.

It is apparent from the above that the pre-forming and pre-heating are accomplished by a single machine in a relatively simple operation, the heating taking place during part of the cycle and while the pre-formed slug is held between the ends of the plungers in an exposed position.

Various changes and modifications may be made without departing from the spirit of the invention, and all of such changes are contemplated as may come within the scope of the claims.

What I claim is:

1. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger supported for movement into the open end of said forming chamber to compress material supported on the first plunger into a pre-formed slug, means for causing simultaneous movement of the ends of said plungers while the slug is gripped therebetween out of the open end of the forming chamber, and means for thereafter heating the slug while gripped between said plunger ends.

2. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger supported for movement into the open end of said forming chamber to compress material supported on the first plunger into a pre-formed slug, means for moving the ends of said plungers together with the slug supported therebetween out of the open end of the forming chamber, an electrode at the end of each plunger, and a conductor for high frequency electricity in electrical connection with each electrode, whereby electricity passing from one electrode to another may cause heating of the slug while the latter is supported between said electrodes in a position removed from said forming chamber.

3. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger supported for movement into the open end of said forming chamber to compress material supported on the first plunger into a preformed slug, means for moving the ends of said plungers together with the slug supported therebetween out of the open end of the chamber, and electrically-operated means including an electrode for receiving high frequency current at the end of each plunger for heating the slug while it is positioned between the two plunger ends and out of said chamber.

4. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger supported for movement into the open end of said forming chamber to compress material supported on the first plunger into a pre-formed slug, hydraulically actuated means for moving said first plunger together with the slug supported thereon out of the open end of the chamber, hydraulic means for retarding movement of said second plunger while said first plunger and slug are being moved whereby said slug is held firmly between said two plunger ends, and means for heating the slug while it is so held and after it has been moved out of the forming chamber.

5. Apparatus for forming slugs of moldable material comprising an hydraulic cylinder, a piston movable in said cylinder, a plunger connected to said piston and extending exteriorly of the cylinder, a forming member supported beyond the cylinder and having a forming chamber extending therethrough, the free end of said plunger projecting into an end of said forming chamber and providing a bottom therefor when the plunger is in retracted position, and said plunger end being movable to a position out of the other end of said forming chamber, a second plunger supported for movement into said last mentioned end of the forming chamber to compress material supported on the first plunger into a preformed slug, means for causing said slug to be gripped and held between said two plunger ends while it is being moved out of said forming chamber by said first plunger, and electrical means operable after the slug has been moved out of the forming chamber by the first plunger and while it is gripped between the two plunger ends for heating the slug.

6. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger supported for movement into the open end of said forming chamber to compress material supported on the first plunger into a preformed slug, means for causing simultaneous movement of the ends of said plungers while the slug is gripped therebetween out of the open end of the forming chamber, an electrode at the end of the first plunger, a conductor for electricity extending longitudinally from said electrode within the plunger and insulated therefrom, said conductor emerging from the plunger at such a location between the hydraulic cylinder and the forming member that it does not interfere with movement of the plunger, an electrode at the end of said second plunger, and a conductor for electricity extending longitudinally from said last mentioned electrode within the plunger and insulated therefrom and emerging from the plunger at a location beyond the point of deepest entry of said plunger into the forming chamber.

7. Apparatus for forming slugs of moldable material comprising a forming member having a forming chamber provided with an open end for receiving moldable material, movable plunger extending into the opposite end of said chamber with the end of the plunger forming a bottom for said chamber when the plunger is in retracted position, a second plunger supported for movement into the open end of said forming chamber to compress material supported on the first plunger into a preformed slug, means for forcibly moving the first plunger together with the slug supported thereon to push the slug out of the open end of the forming chamber, means for retarding upward movement of said second plunger while the slug is being moved out of the forming chamber by said first plunger whereby the slug is tightly gripped between the two plunger ends during such movement, and means for heating the slug while it is supported between said plunger ends and after it is removed from the forming chamber.

8. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, a second plunger positioned for movement into the open end of said forming chamber to compress material supported on the first plunger into a preformed slug, a piston at the outer end of said second plunger, an hydraulic cylinder in which said piston is movable, means for forcibly moving the first plunger together with the slug supported thereon out of the open end of the forming chamber, an hydraulic circuit for said hydraulic cylinder, means in said hydraulic circuit for retarding flow of hydraulic fluid from behind the piston of the second plunger when the first plunger is moved outwardly whereby the slug is firmly held between the two plunger ends as it is being moved out of the forming chamber, and means for heating the slug after it has been moved out of the forming chamber and while it is supported between said plunger ends.

9. Apparatus for forming slugs of moldable material comprising a forming member having a forming chamber provided with an open end for receiving moldable material, a movable first plunger extending into the opposite end of said chamber with the end of the plunger forming a bottom for said chamber when the plunger is in retracted position, a second plunger supported for movement into the open end of said forming chamber to compress material supported on the first plunger into a preformed slug, means including a slidable feed plunger for delivering a measured batch of moldable material to the forming cylinder, a piston on said plunger, an hydraulic cylinder in which said piston is movable, an hydraulic cylinder for actuating said first plunger to extensibly move the slug supporting end of the first plunger out of the open end of said forming chamber, an hydraulic cylinder for actuating said second plunger, an hydraulic circuit interconnecting said three hydraulic cylinders, means embodied in said circuit for causing withdrawal movement of said feed plunger while said first plunger is being retracted, means embodied in said hydraulic circuit for by-passing hydraulic fluid from one side of the cylinder for said second plunger to the other side a pressure relief valve in said hydraulic circuit and communicating with said by-passing means, said extensible movement of said first plunger being adapted to cause movement of said slug out of said forming chamber and simultaneous retractile movement of said second plunger, and means for heating said slug while it is supported between said plunger ends and after it has been moved out of said forming chamber.

10. Apparatus for forming slugs of moldable material comprising a forming member having a forming chamber provided with an open end for receiving moldable material, a movable plunger extending into the opposite end of said chamber with the end of the plunger forming a bottom for said chamber when the plunger is in retracted position, electrical insulating material connected to the end of said plunger, an electrode connected to said plunger outwardly of said insulating material, a second plunger supported for movement into the open end of said forming chamber to compress material supported on the electrode of said first plunger into a preformed slug, electrical insulating material connected to the outer end of said second plunger, an electrode connected to the outer face of said insulating material, means for causing simultaneous movement of the ends of said plungers while said slug is gripped between said electrodes to move the slug and both electrodes out of the open end of said forming chamber, and means including conductors for high frequency electricity connected with said electrodes and operable after the slug and electrodes have been moved out of the forming chamber and while said slug is gripped between said electrodes for heating the slug.

WILLIAM S. RENIER.

REFERENCES CITED

The following references are of record in the file of this patent:

UNITED STATES PATENTS

| Number | Name | Date |
|---|---|---|
| 526,951 | Taylor | Oct. 2, 1894 |
| 1,073,856 | Jacobsen | Sept. 23, 1913 |
| 1,707,314 | Towler et al. | Apr. 2, 1929 |
| 1,935,872 | Collins | Nov. 21, 1933 |
| 1,997,268 | Scharpf | Apr. 9, 1935 |
| 2,054,476 | Derry et al. | Sept. 15, 1936 |
| 2,067,401 | Lassman | Jan. 12, 1937 |
| 2,155,316 | Lauterbach | Apr. 18, 1939 |
| 2,214,505 | Magnenat | Sept. 10, 1940 |
| 2,293,815 | Gates | Aug. 25, 1942 |
| 2,341,617 | Hull | Feb. 15, 1944 |
| 2,354,714 | Strickland, Jr. | Aug. 1, 1944 |
| 2,370,624 | Gillespie | Mar. 6, 1945 |
| 2,386,966 | MacMillin | Oct. 16, 1945 |
| 2,423,915 | Wacker | Aug. 15, 1947 |